United States Patent
Sherburne

(10) Patent No.: US 11,168,248 B1
(45) Date of Patent: Nov. 9, 2021

(54) NANOCRYSTALS IMPREGNATED POROUS ARTICLE AND METHOD OF MAKING AND USING SAME

(71) Applicant: Government of the United States, as represented by the Secretary of the Air Force, Wright-Patterson AFB, OH (US)

(72) Inventor: Michael D. Sherburne, Albuquerque, NM (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/001,724

(22) Filed: Aug. 25, 2020

Related U.S. Application Data

(60) Provisional application No. 63/057,313, filed on Jul. 28, 2020.

(51) Int. Cl.
| | |
|---|---|
| C09K 11/02 | (2006.01) |
| G01T 1/202 | (2006.01) |
| C09K 11/08 | (2006.01) |
| C09K 11/88 | (2006.01) |
| C09K 11/62 | (2006.01) |
| C09K 11/70 | (2006.01) |
| C09K 11/56 | (2006.01) |

(Continued)

(52) U.S. Cl.
CPC ............ *C09K 11/025* (2013.01); *C09K 11/02* (2013.01); *C09K 11/0883* (2013.01); *C09K 11/565* (2013.01); *C09K 11/623* (2013.01); *C09K 11/703* (2013.01); *C09K 11/883* (2013.01); *G01T 1/2023* (2013.01); *B82Y 20/00* (2013.01); *B82Y 40/00* (2013.01)

(58) Field of Classification Search
CPC ...... C09K 11/025; C09K 11/02; C09K 11/883; C09K 11/703; C09K 11/623; C09K 11/565; C09K 11/0883; G01T 1/2023; B82Y 20/00; B82Y 40/00
See application file for complete search history.

(56) References Cited

U.S. PATENT DOCUMENTS

| 10,023,793 B2 * | 7/2018 | Budd ..................... C09K 11/02 |
| 2020/0048545 A1 * | 2/2020 | Kalisman ............. H01L 33/505 |

FOREIGN PATENT DOCUMENTS

| EP | 2976409 | * | 5/2017 |
| WO | WO 2015/168504 | * | 12/2015 |

OTHER PUBLICATIONS

Translation for WO 2015/168504, Dec. 10, 2015.*

(Continued)

*Primary Examiner* — C Melissa Koslow
(74) *Attorney, Agent, or Firm* — AFMCLO/JAZ; James F McBride

(57) ABSTRACT

The present invention relates to devices for detecting radiation by the excitation of colloidal nanocrystals within a porous article and methods of using same. The aforementioned device is inexpensive and can be fabricated quickly in order to detect radiation. Due to the use of colloidal nanocrystals which have been known to have a decay constant of under 100 ps when energetic electrons produced by an incident x-ray excite the nanocrystals, this device can be used in fast radiation detection of x-rays.

17 Claims, 11 Drawing Sheets

(51) Int. Cl.
*B82Y 40/00* (2011.01)
*B82Y 20/00* (2011.01)

(56) References Cited

OTHER PUBLICATIONS

Turtos, R. M.; Gundacker, S.; Omelkov, S.; B. Mahler, B.; Khan, A. H.; Saaring, J.; Z. Meng, Z.; Vasil'ev, A., Dujardin, C.; Kirm, M.; Moreels, I.; Auffray, E.; P. Lecoq, P.; On the use of CdSe scintillating nanoplatelets as time taggers for high-energy gamma detection, npj 2D Materials and Applications, 37, 2019, 1-10.
Burke, E.; Williams, P.; Dehaven, S.; Gupta, M.; Dennis Waldron III, D.; III. Scintillating Quantum Dots for Imaging X-Rays (Sqdix) for Aircraft Inspection. Technical Report, NASA LaRC Non-Destructive Sciences Branch, 2014, 1-32.
Turtos, R.M.; Gundacker, S.; Polovitsyn, A. A.; Christodoulou, S.; Salomoni, M.; Auray, E.; Moreels, I.; Lecoq, P.; Grim, J.Q; Ultrafast emission from colloidal nanocrystals under pulsed x-ray excitation. Journal of Instrumentation, 2016, 1-14.
Sherburne, M. D.; Thesis X-Ray Detection and Strain Sensing Applications of Colloidal Quantum Dots, Part 1 Mar. 20, 2020.
Sherburne, M. D.; Thesis X-Ray Detection and Strain Sensing Applications of Colloidal Quantum Dots, Part 2 Mar. 20, 2020.
Sherburne, M. D.; Thesis X-Ray Detection and Strain Sensing Applications of Colloidal Quantum Dots, Part 3 Mar. 20, 2020.
Sherburne, M.; Laurvick, T.; Burggraf, L.; Bean,I.; Crandall, P.; Du, M.; Adams, C.; Burke, E.; Osinski, M.; Senthil, A.; Bosomtwi, D.; Gharde, S.; Alas, G.; Ivanov, S.; Klimov, V.; Fedin, I.; Weber, T.; Characterizing Nanomaterial Response for sub-100 ps X-ray Scintillation Oct. 22, 2019, 1.
U.S. Appl. No. 17/001,719.

* cited by examiner

NANOCRYSTALS IMPREGNATED POROUS ARTICLE AND METHOD OF MAKING AND USING SAME

CROSS-REFERENCE TO RELATED APPLICATION

The present application claims priority to U.S. Provisional Application Ser. No. 63/057,313 filed Jul. 28, 2020, the contents of which is hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to nanocrystals impregnated porous article and method of making and using same.

BACKGROUND OF THE INVENTION

Presently available radiation detectors are used to measure ionizing radiation such as gamma rays, x-rays and energetic charged particles such electrons, protons, beta and alpha particles. Such detectors may be comprise of an optical imaging device and one or more radiation scintillators that interact with the radiation that is to be measured to produce optical photons. Such scintillators emit photons that are transferred to the aforementioned optical imaging device. The imaging device then converts the quantity of photons into an electrical signal that is proportional to the energy deposited by the original radiation detected by the scintillator(s). Thus, providing the radiation detector user with useful information regarding radiation energy, intensity and changes in same over time.

Unfortunately such detectors require separate equipment and/or architectures to accurately measure each type of radiation. In addition, the setup and build of such detectors is time consuming as the required scintillator(s) cannot be quickly, easily and inexpensively manufactured. In addition, the time resolution of such radiation detectors is not sufficient for developing applications, such as the study of short lived particles, and nuclear fusion applications that involve fast pulsed radiation generation. Nanocrystals have been employed to address these problems. Such nanocrystals have been coated on surfaces, and incorporated into fibers and polymers. Unfortunately, nanocrystal coatings are not thick enough to efficiently detect high energy particles. Moreover, when such nanocrystals are incorporated into fibers and polymers the emission of the light that is emitted from the interaction of the radiation with nanocrystals is delayed or attenuated or scattered depending on the nature of the fiber or polymer. Applicant recognized that the problems associated with presently available nanocrystal technologies was a combination of lack of thickness coupled with a control of matrix porosity. Thus, Applicant discloses an inexpensive, efficient scintillator that can be easily and quickly manufactured. In addition, Applicant's scintillator has the thickness and porosity that solves the problem of light emission attenuation and delay. Furthermore, unlike previous scintillator's, Applicant's scintillator can not only be used as a detector but can simultaneously be used as an optical convertor as the nanocrystals in such scintillator can transfer incoming radiation to the scintillator's matrix which then emits a different wavelength of electromagnetic radiation than that of the incoming radiation. Such scintillator as well as processes of making and using same are further detailed herein.

SUMMARY OF THE INVENTION

The present invention relates to devices for detecting radiation by the excitation of colloidal nanocrystals within a porous article and methods of using same. The aforementioned device is inexpensive and can be fabricated quickly in order to detect radiation. Due to the use of colloidal nanocrystals which have been known to have a decay constant of under 100 ps when energetic electrons produced by an incident x-ray excite the nanocrystals, this device can be used in fast radiation detection of x-rays.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Definitions

Figure 1:
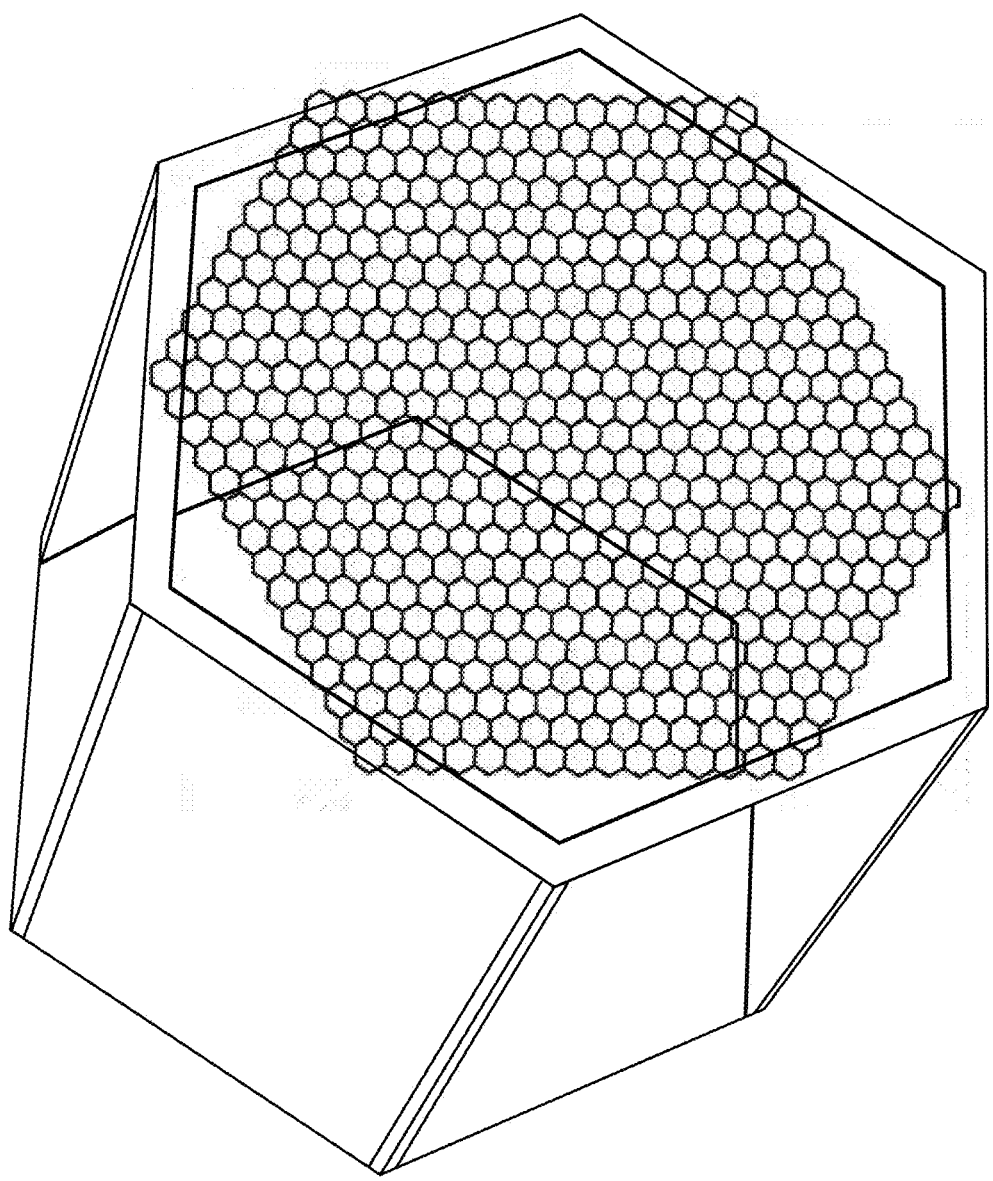
FIG. 1 is showing a preferred configuration of the porous article as an organic 3D printed honeycomb structure. In addition, it is showing the preferred fabrication of dispersing colloidal nanocrystals on the top of the honeycomb structure by having the honeycomb structure having few edges on a stand.

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

DETAILED DESCRIPTION OF THE INVENTION

Nanocrystal Impregnated Porous Articles

For purposes of this specification, headings are not considered paragraphs and thus this paragraph is Paragraph 0035 of the present specification. The individual number of each paragraph above and below this paragraph can be determined by reference to this paragraph's number. In this Paragraph 0035, Applicant discloses nanocrystal impregnated porous articles comprising a matrix with any hollow geometry (pores) filled with scintillating nanocrystals. Such nanocrystals are able to be excited by radiation and emit light. The hollow geometry may consist of cylinders, spirals, etc. which also may be allowed to intersect each other provided that at least one end of the porous article is open to the surface.

Applicant discloses an article comprising:
  a) a porous matrix comprising pores having a circumference of about 20 nm to about 1 mm, preferably said pores having a circumference of about 500 µm to about 1 mm, more preferably said pores having a circumference of about 10 µm to about 500 µm, most preferably said pores having a circumference of about 100 nm to about 10 µm; from about 1% to about 100% of said porous matrix's pores being in said circumference range, preferably from about 50% to about 100% of said porous matrix's pores being in said circumference range, more preferably from about 95% to about 100% of said porous matrix's pores being in said circumference range;
  b) colloidal nanocrystals disposed within said pores, and
  c) an optional capping layer,
said article having a porosity of from about 1% to about 95%, preferably said article has a porosity of from about 40% to about 90%, more preferably said article having a porosity of from about 60% to about 90%, most preferably said article having a porosity of from about 80% to about 90%, said article having a thickness of from about, 100 µm to about 0.6 m, preferably said article having a thickness of from about, 200 µm to about 1 cm, more preferably said article having a thickness of from about, 500 µm to about 5 mm, most preferably said article having a thickness of from about, 800 µm to about 2 mm and a quantum efficiency of greater than or equal to 5%, a quantum efficiency of about 5% to about 100%, a quantum efficiency of about 20% to about 100%, a quantum efficiency of about 40% to about 100%, a quantum efficiency of about 60% to about 100%.

Applicant discloses the article of Paragraph 0036 wherein said matrix comprises a polymer, a metal, a ceramic, and/or a wood, preferably:
  a) said polymer comprises a material selected from the group consisting of a polyamide, a polyester, a polycarbonate, a silicone, a polyethylene, an polyacrylate, a polysaccharide and mixtures thereof, preferably said polymer comprises a material selected from the group consisting of a polyester, a polyethylene, a polycarbonate and mixtures thereof, more preferably said polymer comprises a material selected from the group consisting of a polylactic acid and mixtures thereof;

b) said metal comprises a material selected from the group consisting of a metal powder and mixtures thereof, preferably said metal comprises aluminum, more preferably said metal comprises an aluminum alloy powder and mixtures thereof, most preferably said metal comprises $AlSi_{10}$ Mg powder;

c) said ceramic comprises a material selected from the group consisting of an inorganic material, a nonmetallic materials, metallic material and mixtures thereof, preferably said ceramic comprises a ceramic monolith, more preferably said ceramic comprises a ceramic honeycomb and mixtures thereof;

d) said wood comprises a material from a perennial plants, preferably said wood comprises a material from a deciduous tree, more preferably said wood comprises beech wood, oak wood and mixtures thereof, most preferably said wood comprises oak wood and mixtures thereof.

Applicant discloses the article of Paragraphs 0036 through 0037 wherein said colloidal nanocrystals are selected from the group consisting of InP/ZnS quantum dots, CdSe/ZnS quantum dots, CdSe quantum dots, PbS quantum dots, PbSe quantum dots, CdS quantum dots, $CuInS_2$/ZnS quantum dots, CdSe nanoplatelets, Mn:ZnSe quantum dots, CdTe, CdTeSeS Type-II quantum dots, $CdS_xSe_{1-x}$/ZnS alloyed quantum dots wherein x is from 0.1 to 0.9 and mixtures thereof, preferably said colloidal nanocrystals are selected from the group consisting of InP/ZnS quantum dots, CdSe/ZnS quantum dots, $CuInS_2$/ZnS quantum dots, Mn:ZnSe quantum dots, $CdS_xSe_{1-x}$/ZnS alloyed quantum dots wherein x is from 0.1 to 0.9 and mixtures thereof, more preferably said colloidal nanocrystals are selected from the group consisting of InP/ZnS quantum dots, CdSe/ZnS quantum dots, $CuInS_2$/ZnS quantum dots, and mixtures thereof, most preferably said colloidal nanocrystals are CdSe/ZnS quantum dots.

Applicant discloses the article according to Paragraphs 0036 through 0038 comprising said capping layer, preferably said capping layer comprises a polymer, more preferably said capping layer comprises an epoxy-based photoresist and mixtures thereof, most preferably said capping layer comprises SU-8 photoresist.

Applicant discloses the article of Paragraphs 0036 through 0039, said article being a light convertor or a scintillator.

Suitable materials for making the nanocrystals impregnated porous article of Paragraphs 0035 through 0040 can be obtained from NNCrystal US Corporation of Fayetteville, Ark., Kayakli Advanced Materials, Inc. of Westborough, Mass. and 3D Systems Rock Hill, S.C.

Process of Making Nanocrystal Impregnated Porous Articles

Applicant discloses a method of fabricating nanocrystals impregnated in the porous article, said any manufacturing method and fabrication technology that can fabricate a porous article to disperse a colloidal mixture of nanocrystals, and said dispersion of colloidal mixture of nanocrystals conforms and dries to the said porous article.

Applicant discloses a method according to Paragraph 0042 wherein said any manufacturing method and fabrication technology can be used to fabricate the porous article, preferably said porous article is manufactured using 3D printing rapid manufacturing, and preferably said device is fabricated by using polymers. Preferably said porous article is also in a honeycomb geometry.

Applicant discloses a method according to Paragraph 0042 wherein said any dispersion of said colloidal mixture of nanocrystals, preferably said colloidal mixture of nanocrystals is within a solution that is compatible with a hydrophilic encouraging solution or hydrophilic encouraging method for said porous article to allow colloidal mixture of nanocrystals to travel through the said porous article and the colloidal mixture of nanocrystals dries in place.

Applicant discloses a process of making an article, comprising:

a) disposing colloidal nanocrystals in the hydrophilic pores of a matrix material by introducing a fluid comprising said colloidal nanocrystals into said hydrophilic pores; and b) passively or actively evaporating said fluid, preferably said evaporation occurs in the temperature range of from about 10° C. to about 80° C., more preferably said evaporation occurs in the temperature range of from about 23° C. to about 80° C., most preferably said evaporation occurs in the temperature range of from about 23° C. to about 40° C., preferably said evaporation is passive evaporation. Proper evaporation temperatures minimize prevents degradation of the colloidal nanocrystals.

Applicant discloses a process according to Paragraph 0045 wherein said article is an article according to Paragraphs 0035 through 0040.

Applicant discloses the process of Paragraphs 0045 through 0046 wherein said fluid comprising said colloidal nanocrystals is applied at a level of from about 10 $nm^3$ to about 1 $m^3$ per 640 $mm^3$ of matrix material, preferably said fluid comprising said colloidal nanocrystals is applied at a level of from about 100 $nm^3$ to about 500 $mm^3$ per 640 $mm^3$ of matrix material, more preferably said fluid comprising said colloidal nanocrystals is applied at a level of from about 500 $um^3$ to about 500 $m^3$ per 640 $mm^3$ of matrix material, most preferably wherein said fluid comprising said colloidal nanocrystals is applied at a level of from about 100 $mm^3$ to about 500 $m^3$ per 640 $mm^3$ of matrix material, said fluid comprising from about 1 ppb to about 1000 ppm of said colloidal nanocrystals, or said fluid comprises from about 1 500 ppb to about 1000 ppm of said colloidal nanocrystals, or said fluid comprises from about 1 ppm to about ppm of said colloidal nanocrystals.

Applicant discloses the process of Paragraphs 0045 through 0047 wherein said pores of said matrix material are treated before disposing said colloidal nanocrystals to increase the pore's hydrophilicity, preferably said treatment comprises contacting said pores with boiling water for at least 5 seconds, preferably said pores are contacted with boiling water for at least 5 seconds to 24 hours, more preferably said pores are contacted with boiling water for at least 5 seconds to 60 minutes, most preferably said pores are contacted with boiling water for at least 5 seconds to 10 minutes.

Applicant discloses the process of Paragraphs 0045 through 0048, comprising the step of 3D printing said matrix material before disposing said colloidal nanocrystals in the hydrophilic pores of said matrix material, preferably said 3D comprises 3D SLA printing and/or 3D multi jet printing.

Method of Using Nanocrystals Impregnated Porous Article

Applicant discloses a method of using nanocrystals impregnated porous article by having an optical device facing the said article. Incident radiation traveling into and/or through the article excites the nanocrystals within the porous article and said nanocrystals emit light to be collected by said optical device.

Applicant discloses a method of collecting spectral information emitted by the said nanocrystals in Paragraph 0050, preferably said use of a collimator that is coupled to an imaging device.

Applicant discloses a method similar to Paragraph 0051 for imaging fast radiation events, preferably said through the use of a streak camera or other such fast imaging devices. Any optical coupling can be used between the said fast imaging device and the said nanocrystals impregnated porous article Applicant discloses a method of using the article of Paragraphs 0035 through 0040 comprising introducing said article to radiation and collecting radiation from said article said collected radiation being the product of the radiation that said article was introduced to, preferably said radiation that said article is introduced to is selected from the group consisting of gamma rays, x-rays, neutrons, charged particles, non-ionized radiation having a wavelength of from about 10 nm to about 0.01 cm, preferably said charged particles are selected from the group consisting of electrons, protons, beta and/or alpha particles and preferably said non-ionized radiation having a wavelength of from about 400 nm to about 1000 nm.

Applicant discloses the method of Paragraph 0053 wherein said collected radiation is the product of the radiation that the nanocrystals of said article emit as a result of said radiation introduction to said article.

Test Methods

Method for determining wavelength emission of light from the impregnated nanocrystals in a porous article. For the purpose of this specification, the following method shall be used:
1) Place the nanocrystal impregnated porous article in the sample chamber of a Horiba-Jovin Fluorolog-3.
2) Rotation of the sample holder is set to right-angle.
3) Sample holder angle is set to 30 degrees.
4) Integration time is set to 0.1 s.
5) Wavelength increment is set to 1.00 nm.
6) Side entrance slit is set to 1.00 nm.
7) Front exit slit is set to 1.00 nm.
8) Emission grating density is set to 1200 grooves/mm and a blaze of 500 nm.
9) Excitation grating is set to 1200 grooves/mm and a blaze of 330 nm.
10) Set excitation lamp at 125 nm below peak emission wavelength of nanocrystal.
11) Sweep excitation wavelength from 15 nm above the set lamp excitation wavelength to an additional 255 nm
12) Collection of spectra is averaged over five times and the average is, for purposes of the present specification, considered to be the wavelength emission of light from the impregnated nanocrystals in the subject porous article.
13) Measure and record the wavelength emission of light.

Method for determining pore circumference and percentage in porous article. For the purpose of this specification, the following method shall be used:
1) Use a Leica DVM6 digital microscope with a high magnification objective PlanApo FOV 3.60 lens to measure the circumference of the pores at the surface of the porous article.
2) Set microscope at a 0 degree tilt.
3) Lower platform to allow placement of the article.
4) Ensure LED light is on.
5) Line up article within the circle of the LED light on the platform.
6) Move platform till article can be seen on the microscope.
7) Either raise or lower platform enough to get article mostly in focus.
8) Right click on the image window and select autofocus.
9) Set Z-step size to 0.25 μm.
10) Click begin experiment.
11) Once finished, go to the right side of the window and click on the 3D image button.
12) Circumference of the pores can be measured in the 3D image interface.
13) Export top-view image to a .png image file.
14) Import .png image file to ImageJ software version 1.51 w.
15) Use ImageJ to find the number of pores.
16) Using the measurement range on the image provided by Leica's LAS X software, calibrate the ImageJ file by entering how many pixels in the .png file corresponds to the measurement range.
17) Use ImageJ to then automate the measurement process of the circumference for each pore.
18) Take circumference values of all pores and calculate the percentage of pores that meet the desired criteria to calculate a percentage of pores that are acceptable in the porous article.

Method for determining article porosity. For the purpose of this specification, the following method shall be used:
1) Measure the bulk volume ($V_T$) of the article by using the specified perimeter and thickness values.
2) $V_T$=Article Perimeter x Article Thickness.
3) Using a graduated cylinder that is 1.5 times the diameter and 2 times the height of the article to be tested, fill the graduated cylinder with deionized water until the water level within the graduated cylinder is the height of the article.
4) Measure volume of water in the graduated cylinder ($V_\alpha$).
5) Submerge article in the graduated cylinder.
6) Measure volume of water in the graduated cylinder ($V_\beta$).
7) Calculate the volume of the void space by using $V_v = V_T - (V_\beta - V_\alpha)$.
8) Use equation $$\phi = \frac{V_V}{V_T}$$

to calculate the porosity of the article. For purposes of the present specification, such porosity value is considered to be the porosity of the article.

Method for determining article thickness. For the purpose of this specification, the following method shall be used:
1) Use Mitutoyo digital calipers (model #: 573-701-20) with a 0-150 mm range and a 0.01 mm resolution.
2) Measure thickness of article by placing article in between the jaws of the caliper.
3) Do three separate measurements and take the average of the three to get the thickness of the article. For purposes of the present specification, such thickness value is considered to be the thickness of the article.

Method for determining article quantum efficiency under gamma irradiation. For the purpose of this specification, the following method shall be used:

1) Obtain a $^{57}$Co disc source with 10 μCi of activity and having gamma energies of 136 keV, 122 keV and 0.7 MeV.
2) Using provided datasheet of the source, write down the original activity in Bq and determine the present-day activity by using the known half-life $t_{1/2}$ which is 271.79 days for $^{57}$Co.
3) Focus on measuring the 14.4 keV decay of $^{57}$Co, which occurs 9.15% out of the overall activity.
4) Place disc source centered 4.13 cm away from a lead collimator with a collimator diameter of 4.82 cm and 3 mm thick.
5) Place nanocrystal impregnated article centered 1cm away on the other side of the lead collimator.
6) Obtain an appropriate photomultiplier tube (PMT) that has approximately over 10% quantum efficiency in the emission wavelength of interest that is emitted by the excited nanocrystals impregnated in the porous article.
7) Obtain appropriate circuitry to operate the PMT at its desired performance parameters which outputs to a computer which has software to read out the current over time (operate in photon counting mode).
8) Set pulse height discriminator to be a higher signal level than the noise of the PMT.
9) Collect photon counting data for 60 minutes or the time required to collect 10,000 total counts from the PMT whichever is faster.
10) Calculate the solid angle Ω of the experimental setup which would be $$\Omega = \frac{\pi R^2}{4\pi d^2}$$

where R is the radius of the active area of the article and d is the distance between the disc source and the detector (4.13 cm in this case).
11) Calculate the attenuation of 14.4 keV gamma in air by using the NIST x-ray database in order to determine the μ/ρ.
12) Take the activity of the source in Bq, multiply it by the solid angle, and multiply by the fraction of 14.4 keV gammas that are not attenuated by air (using the calculated μ/ρ and using the Beer-Lambert law $$I = I_0 e^{\frac{\mu}{\rho}\rho x}$$

in order to determine the number of photons per second that reach the surface of the article.
13) Backtrack from the current reading out of the PMT in order to determine the number of photons being emitted per second from the nanocrystal impregnated article.
14) Find the 14.4 keV peak on the histogram counter, then determine the number of counts within the full width at half max (FWHM) of the peak.
15) Convert the number of counts to the total amount of charge collected by the PMT (e.g. if the bin at 14.4 keV is 100 μC of charge and there were 10,000 counts over 60 minutes, then there was 1 C of charge collected in total over 60 minutes).
16) Convert Coulombs to electrons by multiplying the total charge in Coulombs by $6.242 \times 10^{18}$ electrons.
17) Divide the number of electrons by the gain of the PMT and then divide by the detection efficiency (contains both the quantum efficiency of the photocathode and the collection efficiency of the dynodes) of the PMT to get the number of incident photons at the surface of the PMT.
18) Divide the incident number of photons entering the surface of the PMT (over 60 minutes or a total of 10,000 counts from PMT whichever is faster) by the number of incident 14.4 keV incident gammas entering the surface of the article (over 60 minutes or a total of 10,000 counts from PMT whichever is faster).

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 2:
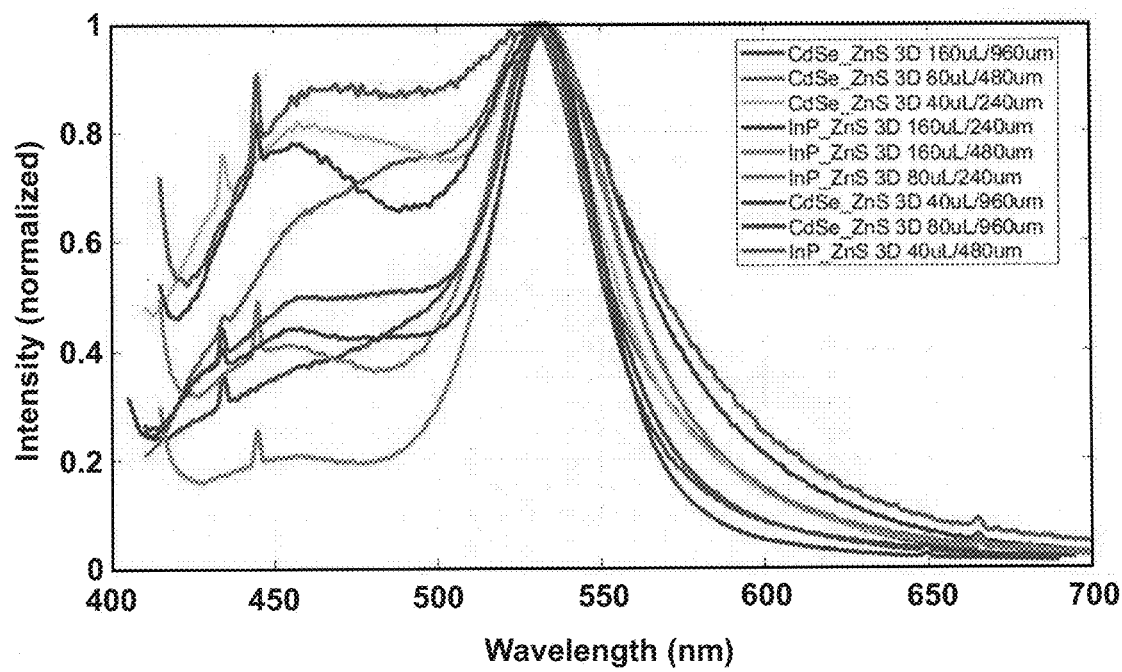
FIG. 2 is showing the photoluminescence spectra of a variety of colloidal nanocrystals with various amounts and in addition, various porous article thicknesses.
Figure 3:
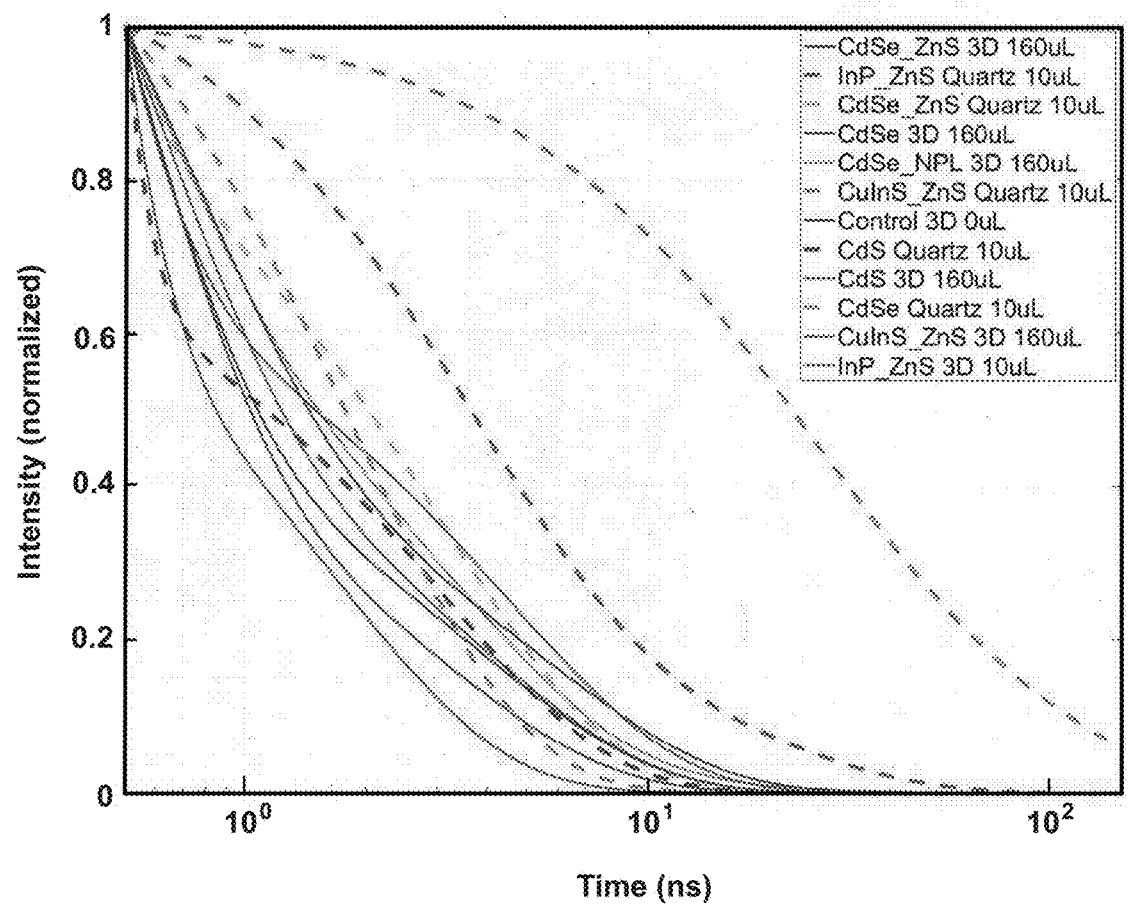
FIG. 3 was showing the emission decay time after a variety of colloidal nanocrystals within a porous article were excited by a pulsed UV-Vis source.
Figure 4:
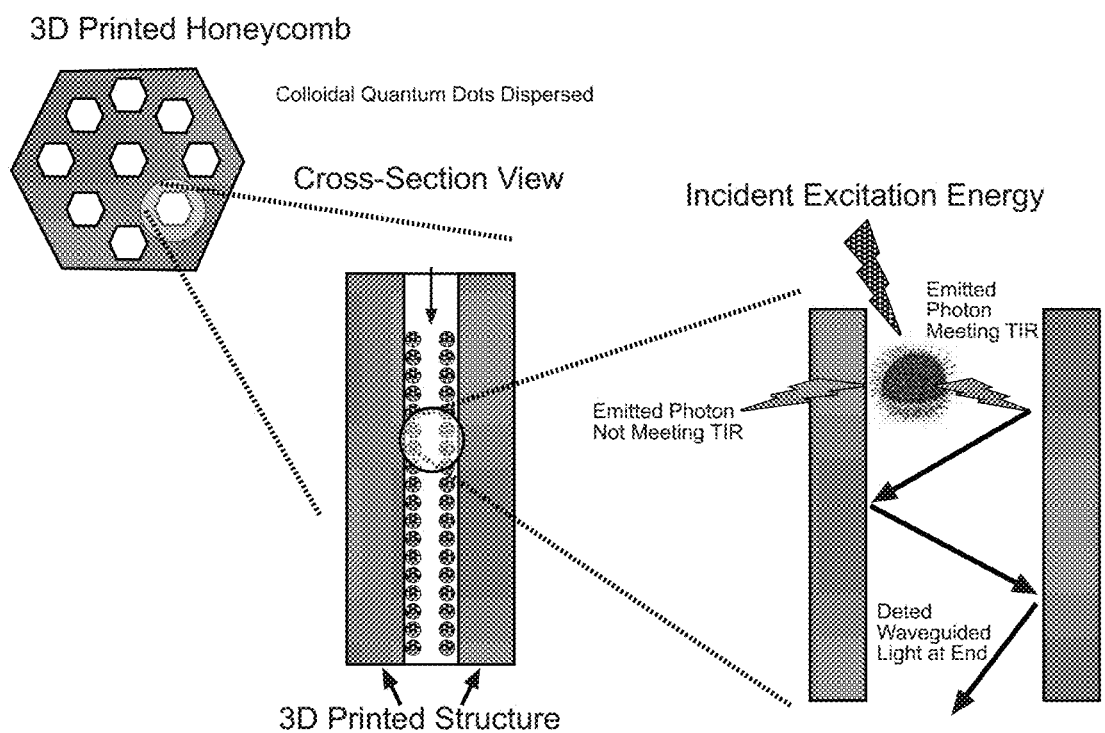
FIG. 4 is showing the use of waveguiding in an organic porous article.

A MultiJet Printing (MJP) 3D printer was used to print out a porous honeycomb structure at a known thickness. The printed honeycomb structure was left in an oven at 70 degrees Celsius on top of a perforated aluminum sheet for 30 minutes to remove most of the wax support structure. The printed honeycomb structure was then moved around in a glass beaker at 250 degrees Celsius to remove the remaining wax support structure. Upon removal of the printed honeycomb structure from the boiling water, a pressurized nitrogen gas was used to dry out the printed honeycomb structure. The printed honeycomb structure was then dipped into the boiling water and immediately placed into water to keep it hydrophilic. The printed honeycomb structure was then placed onto a stand as seen in FIG. 1 and then doused in isopropyl alcohol to replace the water content with isopropyl alcohol. A known amount of a colloidal quantum dot mixture (CdSe, CdSe/ZnS, CdSe NPLs, InP/ZnS, CuInS/ZnS, PbSe, and PbS) was dispersed on top of the wet printed honeycomb structure and was let to dry for five minutes. The nanocrystal impregnated honeycomb structure was then capped with SU-8-5 and cured onto one side of a quartz disc. Example emission spectra from the can be seen in FIG. 2:

As discussed in Paragraph 0061 the device also had an example UV-Vis excitation spectra as was seen in FIG. 3:

The porous structure can be designed to make use of organic waveguiding technology. The porous structure is designed in such a way to allow the total internal reflection (TIR) to occur which will create an optical waveguiding effect. This optical waveguiding is useful to increase the overall quantum efficiency of the radiation detector as directional emission of the nanocrystals is either difficult to control or isotropic. An example can be seen in FIG. 4:

The device as described in Paragraph 0061 can operate as a neutron detector when using an organic or low-Z medium material. These materials could either encourage proton recoil or other neutron material interactions that cause charged particles to emit. The nanocrystals lining the interior of the porous article will become excited by the charged particles and then emit light. This can be combined with the waveguiding principles as well as described in Paragraph 0063 .

Figure 5:
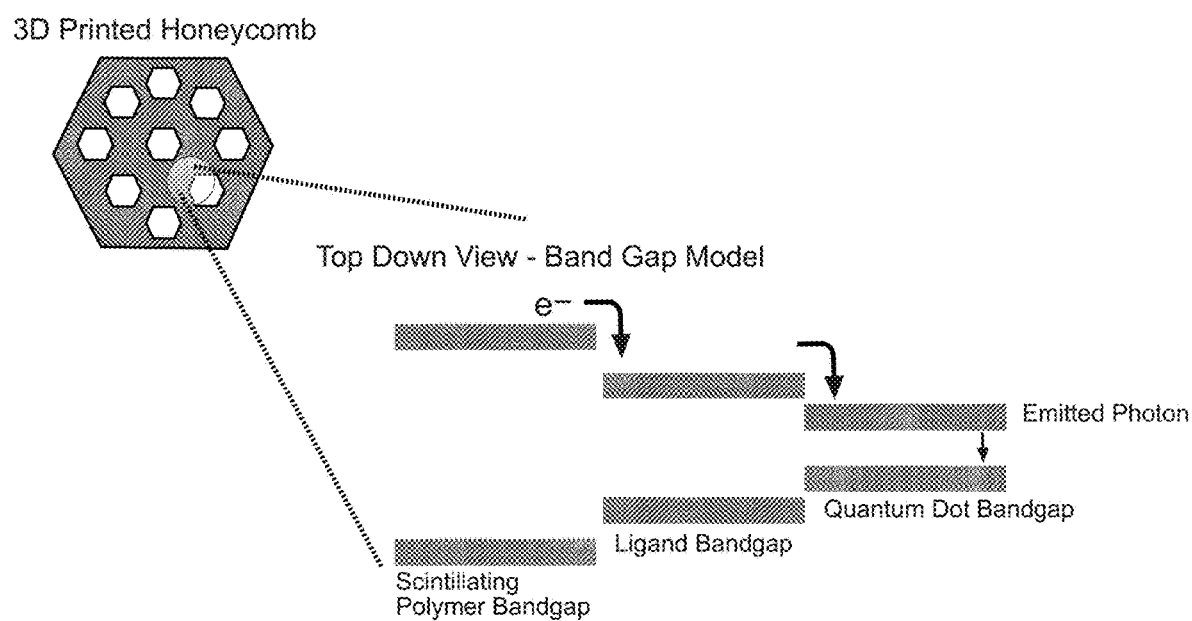
FIG. 5 is showing bandgap engineering applied to an organic porous article to transfer charge to the colloidal nanocrystals lining the interior of the said article.
Figure 6:
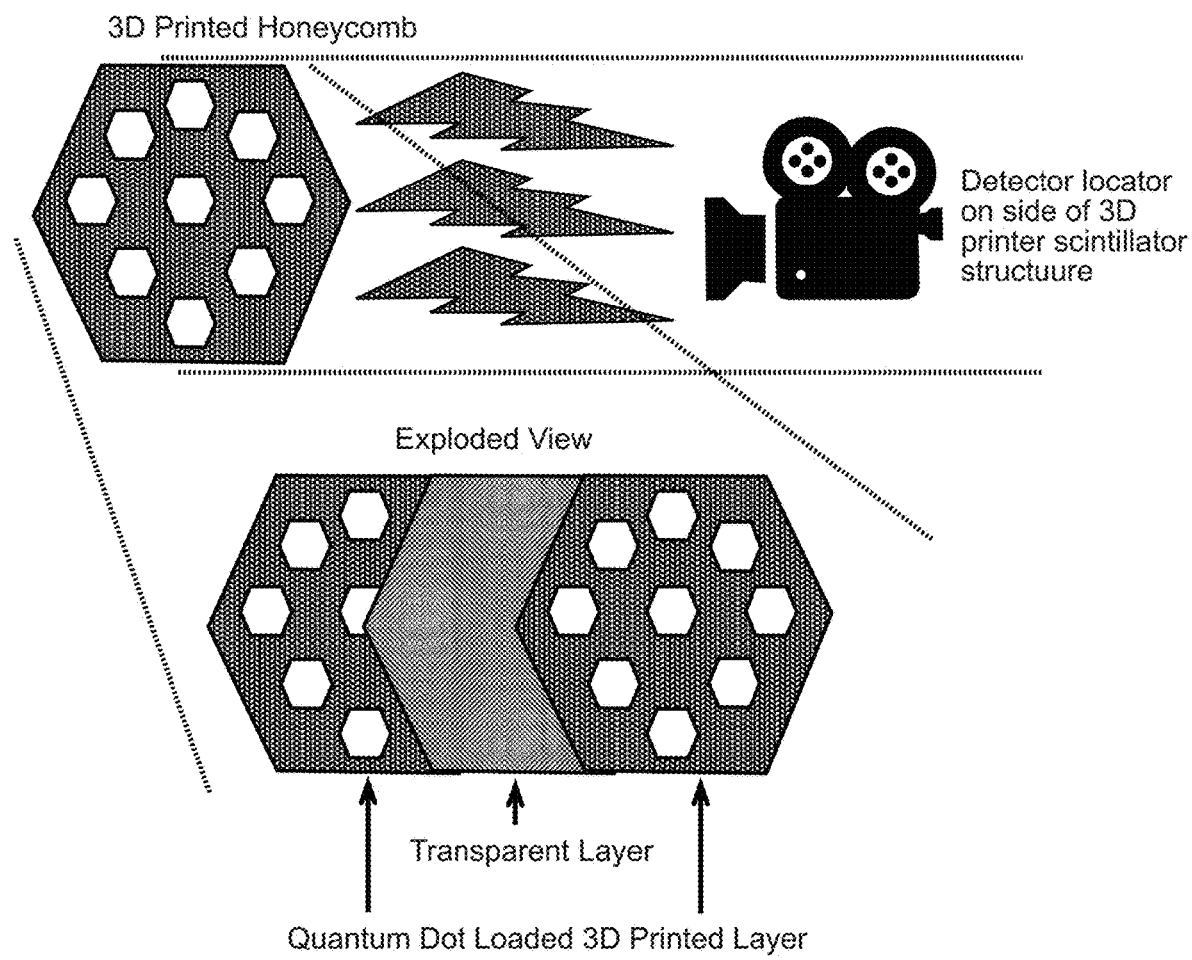
FIG. 6 is stacking porous articles with a transparent layer in between the porous articles.

The organic polymer that makes up the porous article can be designed to make use of band gap engineering in order to encourage charge transfer towards the nanocrystals lining the interior of the porous article. Any charges that come out of the process of radiation interaction can be absorbed by the organic polymer and then that charge can travel to the ligands encapsulating the nanocrystal and then into the nanocrystal itself which will in turn excite the nanocrystal. This will then cause additional emission of light, and thereby increasing the quantum efficiency of the device. This can be further described in FIG. 5:

The device described in Paragraph 0061 does not have to be a single piece of porous material. The porous article can be stacked multiple times with a transparent layer in between each porous article. Light emitted from each stacked piece of porous article can then travel along the transparent layer to an optical system on the side. This is useful when needing additional thickness of nanocrystals for better radiation detection efficiency, along with faster emission response due to smaller distance needed for the emitted light to reach the optical system on the side. This can be seen in FIG. 6.

Figure 7:
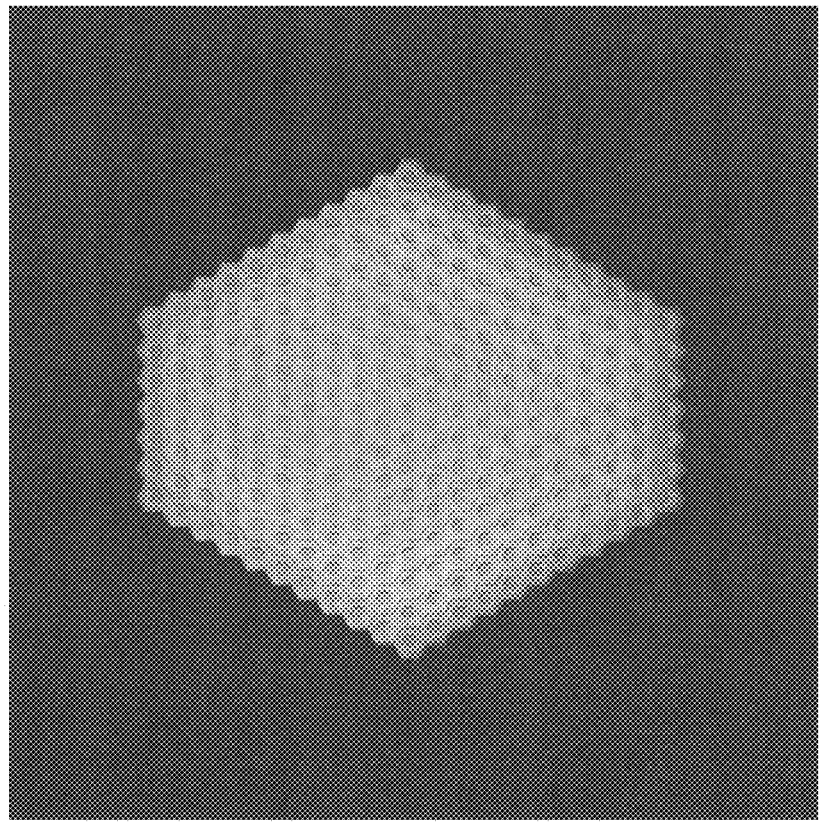
FIG. 7 is a rigid structure encapsulating circumference of an organic porous article.
Figure 8:
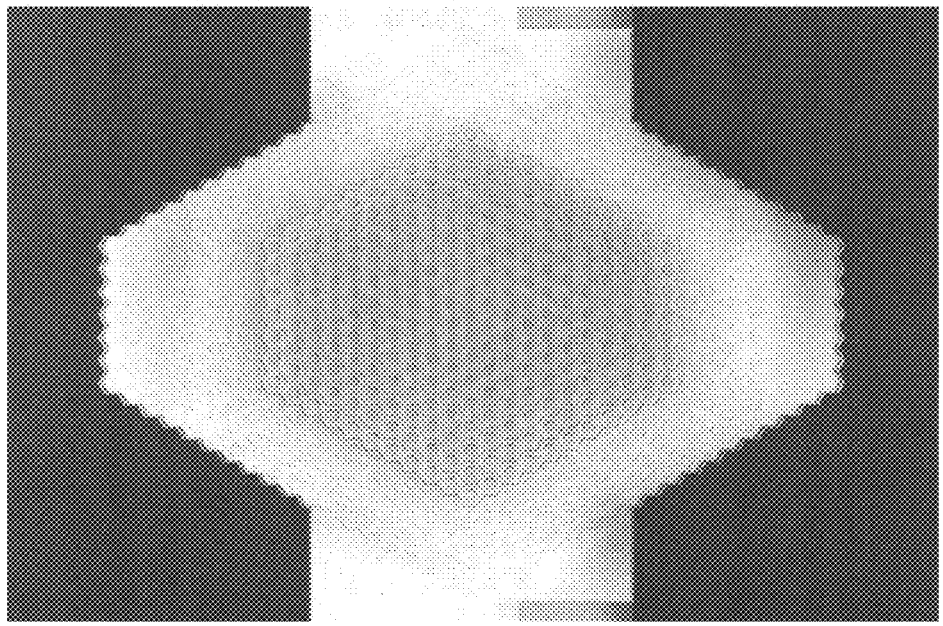
FIG. 8 is an exploded view of a rigid structure encapsulating circumference of an organic porous article.
Figure 9A:
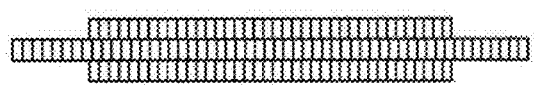
FIG. 9A is a short side view of an improved 3D printed porous article design that shows the main area in the middle which is surrounded by a lip that slides into and ultimately surrounded by a shroud to prevent warping while using solvents to disperse colloidal nanocrystals into the pores.
Figure 9B:
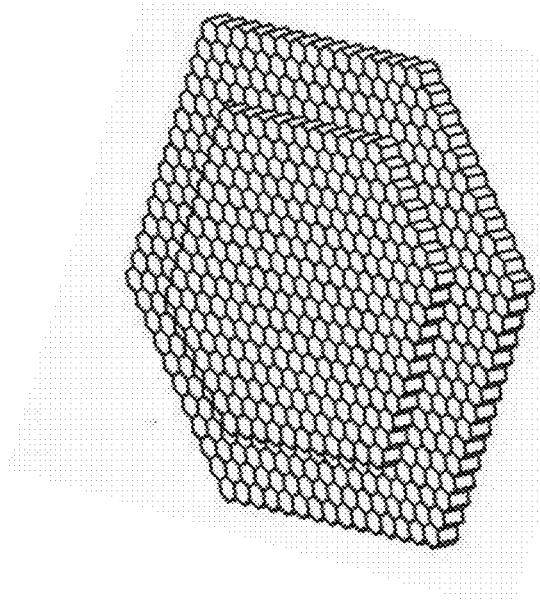
FIG. 9B is an isometric view of an improved 3D printed porous article design that shows the main area in the middle which is surrounded by a lip that slides into and ultimately surrounded by a shroud to prevent warping while using solvents to disperse colloidal nanocrystals into the pores.
Figure 9C:
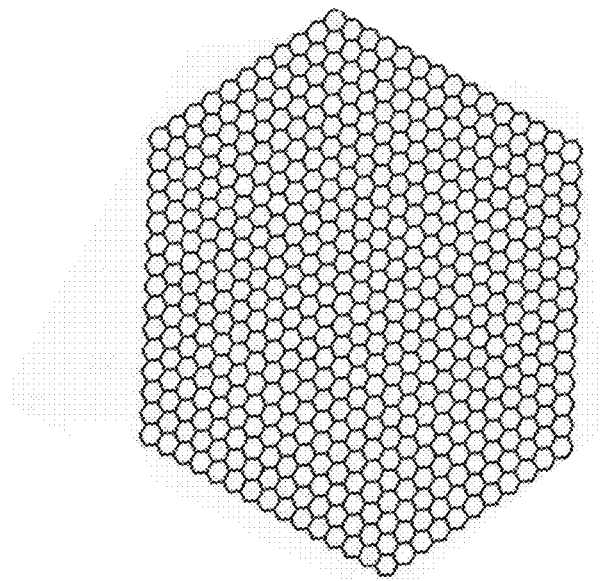
FIG. 9C is a long side view of an improved 3D printed porous article design that shows the main area in the middle which is surrounded by a lip that slides into and ultimately surrounded by a shroud to prevent warping while using solvents to disperse colloidal nanocrystals into the pores.
Figure 9D:
FIG. 9D is top view of an improved 3D printed porous article design that shows the main area in the middle which is surrounded by a lip that slides into and ultimately surrounded by a shroud to prevent warping while using solvents to disperse colloidal nanocrystals into the pores.
Figure 10A:
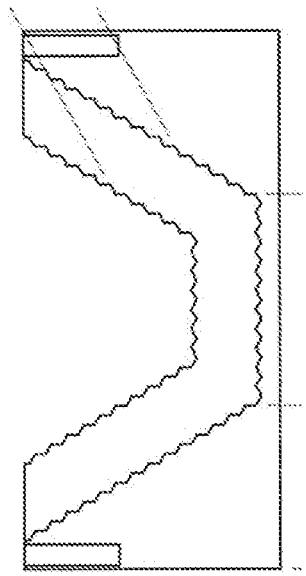
FIG. 10A is a top view of a shroud that encompasses one side (female) of the improved 3D printed porous article design to prevent warping while using solvents to disperse colloidal nanocrystals into the pores.
Figure 10B:
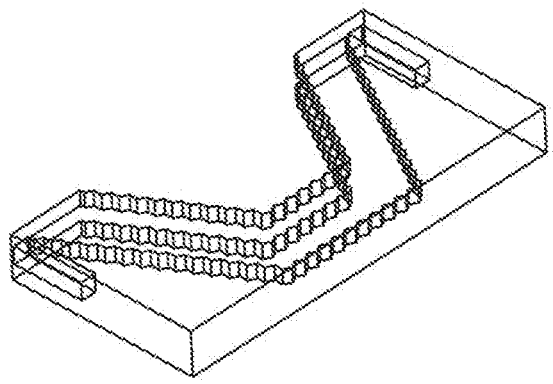
FIG. 10B is an isometric view of a shroud that encompasses one side (female) of the improved 3D printed porous article design to prevent warping while using solvents to disperse colloidal nanocrystals into the pores.
Figure 10D:
FIG. 10D is a short side view of a shroud that encompasses one side (female) of the improved 3D printed porous article design to prevent warping while using solvents to disperse colloidal nanocrystals into the pores.
Figure 10C:
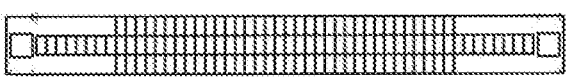
FIG. 10C is a long side view of a shroud that encompasses one side (female) of the improved 3D printed porous article design to prevent warping while using solvents to disperse colloidal nanocrystals into the pores.
Figure 11A:
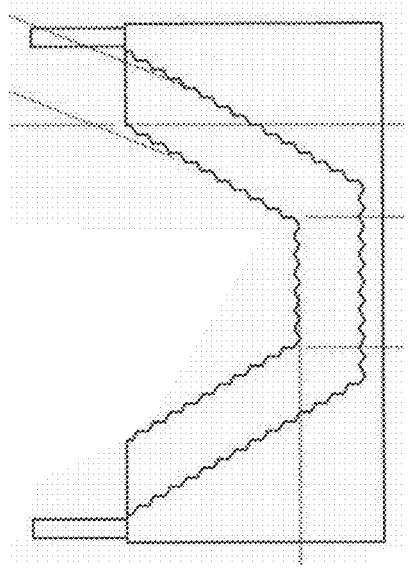
FIG. 11A is a top view of a shroud that encompasses one side (male) of the improved 3D printed porous article design to prevent warping while using solvents to disperse colloidal nanocrystals into the pores.
Figure 11B:
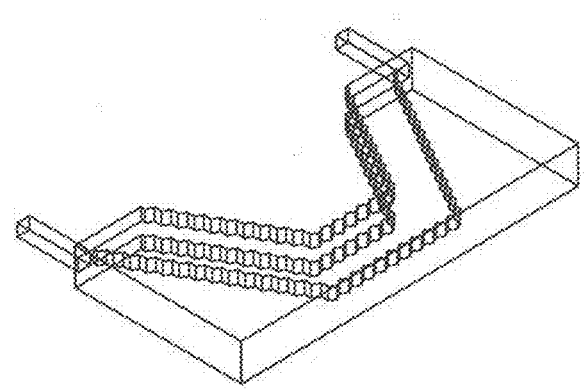
FIG. 11B is an isometric view of a shroud that encompasses one side (male) of the improved 3D printed porous article design to prevent warping while using solvents to disperse colloidal nanocrystals into the pores.
Figure 11C:
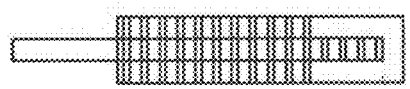
FIG. 11C is a long side view of a shroud that encompasses one side (male) of the improved 3D printed porous article design to prevent warping while using solvents to disperse colloidal nanocrystals into the pores.
Figure 11D:
FIG. 11D is a short side view of a shroud that encompasses one side (male) of the improved 3D printed porous article design to prevent warping while using solvents to disperse colloidal nanocrystals into the pores.

It was noticed that a solvent like isopropyl alcohol can cause warping of the edges of a 3D printed organic porous article. A solution for this is to add a sturdy supporting rim encapsulating the circumference of the porous article. Preferably said this is in two pieces that interconnect together around the porous article. This structure would allow additional ways to disperse the colloidal nanocrystal solution within the porous article without the unintended warping effects of the organic material when exposed to certain solvents. This can be seen in FIG. 7 when closed and FIG. 8 when taken apart:

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An article comprising:
a) a porous matrix comprising pores having a circumference of about 20 nm to about 1 mm from about 1% to about 100% of said porous matrix's pores being in said circumference range;
b) colloidal nanocrystals disposed within said pores, and
c) an capping layer, said capping layer comprising an epoxy-based photoresist;
said article having a porosity of from about 1% to about 95%, said article having a thickness of from about, 100 µm to about 0.6 m and a quantum efficiency of greater than or equal to 5%.

2. The article according to claim 1 wherein said porous matrix comprises pores having a circumference of about 500 µm to about 1 mm from about 50% to about 100% of said porous matrix's pores being in said circumference range; said article having a porosity of from about 40% to about 90%; said article having a thickness of from about, 200 µm to about 1 cm; and a quantum efficiency of about 5% to about 100%.

3. The article according to claim 2 wherein said porous matrix comprises pores having a circumference of about 10 µm to about 500 µm from about 95% to about 100% of said porous matrix's pores being in said circumference range; said article having a porosity of from about 60% to about 90%; said article has a thickness of from about 800 µm to about 2 mm; and a quantum efficiency of about 20% to about 100%.

4. The article according to claim 3 wherein said porous matrix comprises pores having a circumference of about 100 nm to about 10 µm; said article having a porosity of from about 80% to about 90%; said article has a thickness of from about 500 µm to about 5 mm; and a quantum efficiency of about 60% to about 100%.

5. The article according to claim 2 said article having a quantum efficiency of about 60% to about 100%.

6. The article of claim 1 wherein said matrix comprises a polymer, a metal, a ceramic, and/or a wood.

7. The article of claim 1 wherein said colloidal nanocrystals are selected from the group consisting of InP/ZnS quantum dots, CdSe/ZnS quantum dots, CdSe quantum dots, PbS quantum dots, PbSe quantum dots, CdS quantum dots, $CuInS_2$/ZnS quantum dots, CdSe nanoplatelets, Mn:ZnSe quantum dots, CdTe, CdTeSeS Type-II quantum dots, $CdS_xSe_{1-x}$/ZnS alloyed quantum dots wherein x is from 0.1 to 0.9 and mixtures thereof.

8. The article of claim 7 wherein said colloidal nanocrystals are selected from the group consisting of InP/ZnS quantum dots, CdSe/ZnS quantum dots, $CuInS_2$/ZnS quantum dots, Mn:ZnSe quantum dots, $CdS_xSe_{1-x}$/ZnS alloyed quantum dots wherein x is from 0.1 to 0.9 and mixtures thereof.

9. The article of claim 8 wherein said colloidal nanocrystals are selected from the group consisting of InP/ZnS quantum dots, CdSe/ZnS quantum dots, $CuInS_2$/ZnS quantum dots, and mixtures thereof.

10. The article of claim 9 wherein said colloidal nanocrystals are CdSe/ZnS quantum dots.

11. The article according to claim 1 wherein said capping layer comprises SU-8 photoresist.

12. A process of making an article according to claim 1, comprising:
a) disposing colloidal nanocrystals in the hydrophilic pores of a matrix material by introducing a fluid comprising said colloidal nanocrystals into said hydrophilic pores, said fluid comprising said colloidal nanocrystals being applied at a level of from about 10 $nm^3$ to about 1 $m^3$ per 640 $mm^3$ of matrix material, said fluid comprising from about 1 ppb to about 1000 ppm of said colloidal nanocrystals; and
b) passively or actively evaporating said fluid.

13. The process of claim 12 wherein said evaporation is passive evaporation and said evaporation occurs in the temperature range of from about 23° C. to about 40° C.

14. A process of making an article according to claim 1, comprising:
a) disposing colloidal nanocrystals in the hydrophilic pores of a matrix material by introducing a fluid comprising said colloidal nanocrystals into said hydrophilic pores, said pores of said matrix material being treated before disposing said colloidal nanocrystals to increase the pore's hydrophilicity, said treatment comprising contacting said pores with boiling water for at least 5 seconds; and b) passively or actively evaporating said fluid.

15. A process of making an article according to claim 1, comprising:

a) disposing colloidal nanocrystals in the hydrophilic pores of a matrix material by introducing a fluid comprising said colloidal nanocrystals into said hydrophilic pores, said matrix material being 3D printed before said colloidal nanocrystals are disposed in the hydrophilic pores of said matrix material; and b) passively or actively evaporating said fluid.

16. A method of using the article of claim 1 comprising introducing said article to radiation and collecting radiation from said article, said collected radiation being the product of the radiation that the nanocrystals of said article emit as a result of said radiation introduction to said article.

17. The article of claim 1, said article being a light convertor or a scintillator.

\* \* \* \* \*